United States Patent
Jacobs, II et al.

(10) Patent No.: US 12,524,791 B2
(45) Date of Patent: Jan. 13, 2026

(54) SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM

(71) Applicant: Desprez, LLC, New London, NH (US)

(72) Inventors: James L. Jacobs, II, Rye Beach, NH (US); Steven M. Lynch, Hudson, NH (US)

( * ) Notice: Subject to any disclaimer, the term of this patent is extended or adjusted under 35 U.S.C. 154(b) by 0 days.

(21) Appl. No.: 18/379,541

(22) Filed: Oct. 12, 2023

(65) Prior Publication Data

US 2024/0095794 A1      Mar. 21, 2024

Related U.S. Application Data

(63) Continuation of application No. 17/901,980, filed on Sep. 2, 2022, now Pat. No. 11,861,671, which is a continuation of application No. 17/307,353, filed on May 4, 2021, now Pat. No. 11,790,421, which is a continuation of application No. 15/073,553, filed on Mar. 17, 2016, now Pat. No. 11,004,126.

(60) Provisional application No. 62/134,357, filed on Mar. 17, 2015.

(51) Int. Cl.
| | |
|---|---|
| G06Q 30/0601 | (2023.01) |
| G06Q 10/101 | (2023.01) |
| G06Q 50/04 | (2012.01) |

(52) U.S. Cl.
CPC ....... *G06Q 30/0611* (2013.01); *G06Q 10/101* (2013.01); *G06Q 30/06212* (2025.08); *G06Q 30/06444* (2025.08); *G06Q 50/04* (2013.01)

(58) Field of Classification Search
CPC ... G06Q 10/06311; G06Q 10/063112–063114; G06Q 10/10; G06Q 10/101–103; G06Q 30/0283; G06Q 30/06; G06Q 50/04; G06Q 30/0601–06444; G06F 30/00; G06F 30/10; G06F 30/12; G06F 30/13; G06F 30/15; G06F 30/17; G06T 2210/04
See application file for complete search history.

(56) References Cited

U.S. PATENT DOCUMENTS

| | | |
|---|---|---|
| 6,295,513 B1 | 9/2001 | Thackston |
| 7,107,268 B1 | 9/2006 | Zawadzki et al. |
| 2001/0032166 A1 | 10/2001 | Ruffo et al. |

(Continued)

OTHER PUBLICATIONS

Using file comparisons to determine whether to automatically add attachments to emails. An IP.com Prior Art Database Technical Disclosure. The IP.com Journal. Authors et. al.: Disclosed Without Attribution. IP.com No. IPCOM000250770D (Year: 2017).*

(Continued)

*Primary Examiner* — William J Allen
(74) *Attorney, Agent, or Firm* — Caldwell Intellectual Property Law

(57) ABSTRACT

In an exemplary embodiment, software made in accordance with the present invention generates a request for quote (RFQ) based on user-provided information, presents a user interface allowing a user to customize the RFQ, generates an e-mail including the RFQ, and sends the e-mail to one or more suppliers. Various corresponding and related systems, methods, and software are described.

20 Claims, 6 Drawing Sheets

(56) References Cited

U.S. PATENT DOCUMENTS

| | | |
|---|---|---|
| 2002/0052807 A1 | 5/2002 | Han et al. |
| 2002/0089534 A1 | 7/2002 | Siekmann |
| 2002/0152133 A1 | 10/2002 | King et al. |
| 2004/0215467 A1 | 10/2004 | Coffman et al. |
| 2005/0049883 A1* | 3/2005 | Boroson ............... G06F 30/00 705/26.1 |
| 2006/0149658 A1 | 7/2006 | Smith |
| 2006/0253214 A1* | 11/2006 | Gross ................... G06F 30/00 705/26.1 |
| 2008/0071606 A1* | 3/2008 | Whiteley ............. G06Q 30/02 705/7.29 |
| 2008/0208934 A1 | 8/2008 | Demsky et al. |
| 2010/0088239 A1 | 4/2010 | Blair et al. |
| 2011/0276395 A1 | 11/2011 | Gaton et al. |
| 2011/0302113 A1 | 12/2011 | Smith et al. |
| 2013/0212197 A1 | 8/2013 | Karlson |
| 2014/0157579 A1 | 6/2014 | Chhabra et al. |
| 2014/0279177 A1 | 9/2014 | Stump |
| 2015/0339744 A1 | 11/2015 | Jaffarian et al. |
| 2016/0098727 A1 | 4/2016 | Carlson et al. |

OTHER PUBLICATIONS

Automatic Synchronisation of Attachments. Original Publication Date: Jun. 12, 2007. IP.com No. IPCOM000153865D. IP. com Electronic Publication Date: Jun. 12, 2007 (Year: 2007).

Late-binding email attachment. Original Publication Date: Jan. 4, 2005. IP.com No. IPCOM000033909D IP.com Electronic Publication Date: Jan. 4, 2005 (Year: 2005).

Grierson, Simpson, RFP's—A binding process or not, Dec. 17, 2012, Lexology, accessed at [https://www.lexology.com/library/detail/aspx?g=7df86021-93f3-4f72-a71805433b963170] (Year: 2012).

Jordan, C. W., W. A. Niven, and R.E. Cavitt. Zephyr: A secure Internet process to streamline engineering. No. UCRL-JC-130755; CONF-981036-. Lawrence Livermore National Lab., CA (United States), 1998. (Year: 1998).

Krar, S. F., Gill, A., & Cahall, J. C. (2003). Exploring advanced manufacturing technologies. New York, NY: Industrial Press. (Year: 2003).

* cited by examiner

FIG. 3

Supplier Selection 300
- ☑ Supplier A
- ☑ Supplier B
- ☐ Supplier C
- . . .
- ☐ Supplier N 304
- Quantity: 100
- Lead-Time: 5 Days
- Need Date: 10/31/2013
- Finishing: None ▽
- Material: Stainless Steel ▽

File to be attached: 📎 Design Document — Representation of Attached Document 308

Cursor 312

Cancel 316

Confirm and create RFQ E-mail 320

120

SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM

CROSS-REFERENCE TO RELATED APPLICATIONS

This application is a continuation of U.S. Nonprovisional application Ser. No. 17/901,980 filed on Sep. 2, 2022, and entitled "SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM," which is incorporated herein by reference in its entirety and is a continuation of U.S. Nonprovisional application Ser. No. 17/307,353 filed on May 4, 2021 and entitled "SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM," which is incorporated herein by reference in its entirety and is a continuation of U.S. Nonprovisional application Ser. No. 15/073,553, filed on Mar. 17, 2016 and entitled "SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM," which is incorporated herein by reference in its entirety and claims the benefit of priority of U.S. Provisional Patent Application Ser. No. 62/134,357, filed on Mar. 17, 2015, and titled "SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM," which is incorporated by reference herein in its entirety.

FIELD OF THE INVENTION

The present invention generally relates to the field of computer-aided design. In particular, the present invention is directed to systems, methods, and software for generating, customizing, and automatedly e-mailing a request for quotation for fabricating a computer-modeled structure from within a CAD program.

BACKGROUND

Presently, CAD (computer-aided design) programs allow designers to create computer models of products to be manufactured. After a design is complete, the designer typically then seeks out one or more suppliers (i.e., parts suppliers, fabricators, manufacturers, etc.), to which they may send a request for quotation (hereinafter "RFQ") in order to obtain a price associated with fabricating the designed structure. Typically, the designer manually drafts the RFQ and sends it to one or more suppliers; however, such manually drafted RFQs often are unclear and/or lacking information that one or more of the suppliers may require to produce an accurate price quote. When a designer sends unclear and/or incomplete RFQs to a supplier, the supplier typically has to contact the designer in order to obtain additional information to fill in the gaps in the RFQ. If the supplier opts not to contact the designer and instead responds to the RFQ with a quote based on their understanding of the RFQ, making assumptions where necessary, the quote may not be accurate and/or the designer may be displeased with the quoted price. In general, when a designer sends an unclear and/or incomplete RFQ to a supplier, at least one of the designer and supplier end up having to waste time and/or money to rectify the situation.

SUMMARY OF THE DISCLOSURE

In an aspect, a system for automatedly generating a request for quotation (RFQ) electronic mail (email) template, the system comprising a computing device configured to receive user-supplied data through a model data link, wherein the user-supplied data includes a design document, identify a subset of user-selectable suppliers from a list of user-selectable suppliers based on the design document, wherein each user-selectable supplier of the subset of user-selectable suppliers includes an associated email address, retrieve supplier data related to the subset of user-selectable suppliers through a supplier data link, render an RFQ electronic mail template as a function of the design document and the supplier data through a design document data link, generate an RFQ electronic mail based on the RFQ electronic mail template through an electronic mail creation data link, and send the RFQ electronic mail to the associated email address of at least one user-selectable supplier of the subset of user-selectable suppliers through an output electronic mail data link.

In another aspect a method for automatedly generating a request for quotation (RFQ) electronic mail (email) template is described. The method includes receiving, using a computing device, user-supplied data through a model data link, wherein the user-supplied data includes a design document, identifying, using the computing device, a subset of user-selectable suppliers from a list of user-selectable suppliers based on the design document, wherein each user-selectable supplier of the subset of user-selectable suppliers includes an associated email address, retrieving, using the computing device, supplier data related to the subset of user-selectable suppliers through a supplier data link, rendering, using the computing device, an RFQ electronic mail template as a function of the design document and the supplier data through a design document data link, generating, using the computing device, an RFQ electronic mail based on the RFQ electronic mail template through an electronic mail creation data link, and sending, using the computing device, the RFQ electronic mail to the associated email address of at least one user-selectable supplier of the subset of user-selectable suppliers through an output electronic mail data link.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a representational screenshot of an RFQ e-mail interface for enabling a user to customize an RFQ e-mail;

DETAILED DESCRIPTION

Aspects of the present invention include systems, methods, and software for generating, customizing, and automatedly e-mailing a RFQ for fabricating a computer-modeled structure from within a CAD program. Herein, a request for quote (RFQ) may be any request for pricing or cost such as a bid, estimate, firm fixed quote or ballpark number, and a structure may be an object or part having a particular geometry, while a computer model may be a virtual representation of a structure and may be created using appropriate CAD programs. Examples of structures include a piece of sheet metal, a solid cube, a cylindrical pipe, an injection molded plastic toy, an article of apparel such as a shirt made of cotton, and an assembly of various parts such as a vehicle, among others. In some embodiments, software made in accordance with the present invention generates an RFQ based on user-provided information, presents a user interface allowing a user to customize the RFQ, generates an e-mail including the RFQ, and sends the e-mail to one or more suppliers. One or more aspects of the present invention can be implemented in any of a wide variety of manners, such as within a single computing device or by two or more networked computing devices, among others. In some embodiments, functionalities of the system may be integrated into computer modeling programs directly via add-on software.

As would be apparent to one reasonably skilled in the art, the invention may be applied to other manufacturing types, including but not limited to the manufacture of apparel. Both sheet metal and apparel designers use CAD systems to design their products, using sheets of flat, material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. CAD programs may be used to visualize the shape of the finished product. In both sheet metal and apparel manufacturing the sheet (metal or fabric) may be cut or stamped by a variety of methods using computerized machines. Units are moved from station to station during manufacture. Where sheet metal is connected by rivets or welding, sheet fabric is connected by stitching or gluing. Surface finishes may be applied to both; both may be painted, silk-screened, or otherwise covered with a protective substance.

Figure 1:
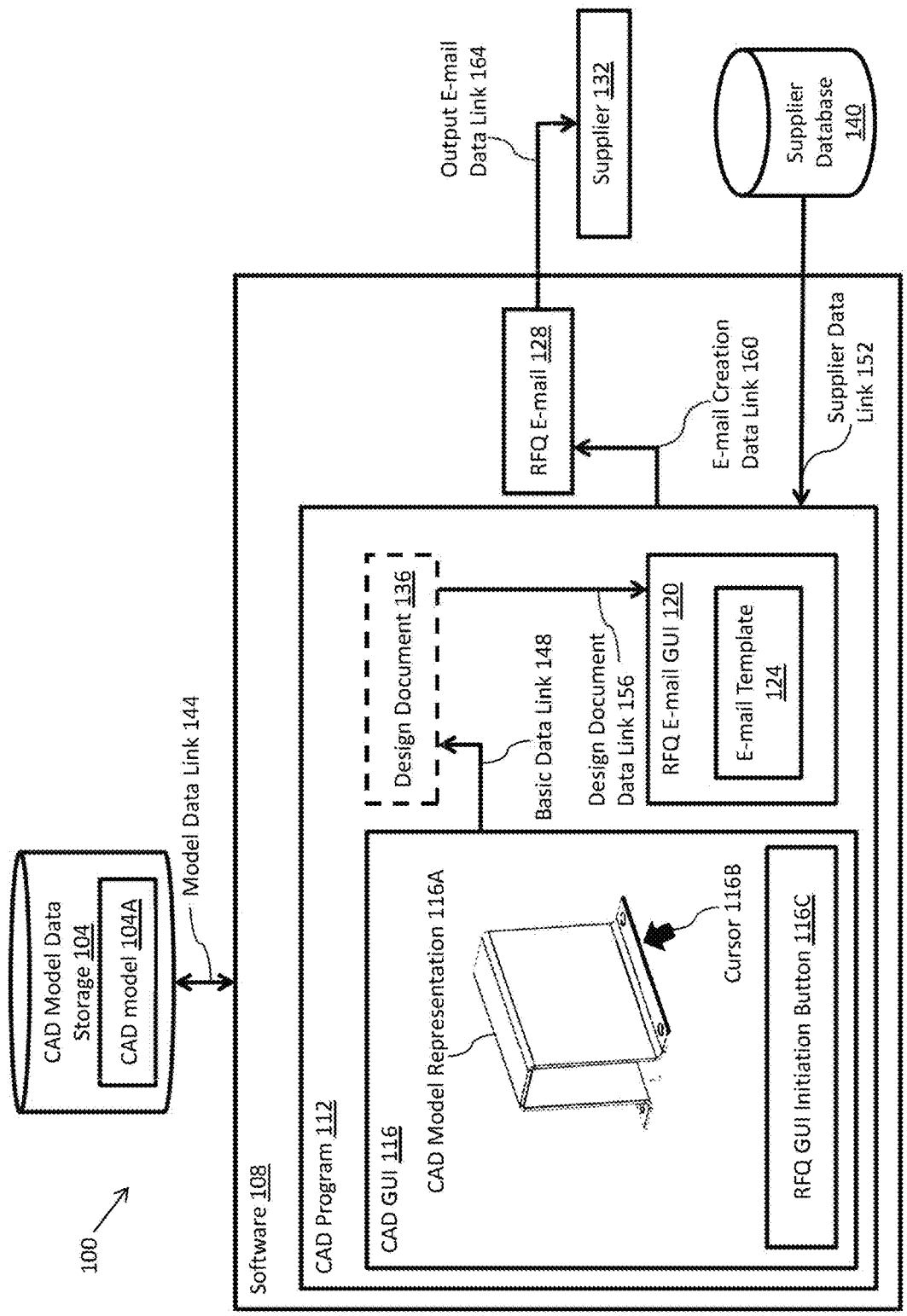
FIG. 1 is a block diagram of an exemplary system for generating, customizing, and automatedly e-mailing an RFQ for fabricating a computer-modeled structure from within a CAD program.

Turning now to the drawings, FIG. 1 illustrates an exemplary RFQ e-mail system 100 made in accordance with the present invention. In this example, RFQ e-mail system 100 includes CAD model data storage 104, which may store information associated with one or more CAD models, such as CAD model 104A. CAD model data storage 104 may comprise one or more databases and may include and/or be implemented in or as a server, a hard drive, a CD, a flash drive, cloud storage, or any other type of data storage. System 100 may further include software 108, which may provide a virtual platform for running various programs and algorithms that may be included in the system. Software 108 may include, for example, one or more operating system, one or more website, one or more virtual machine, and one or more CAD program, such as CAD program 112, among others. It is noted that although FIG. 1 depicts CAD model data storage 104 as being separate from software 108 and CAD program 112 for the purposes of this example, it will be appreciated that, in some embodiments, the software and/or CAD program may contain the CAD model data storage.

CAD program 112 may allow a user to design and/or edit computer-modeled structures, which may be imported from another location and may be designed using another CAD program. CAD program 112 may include a number of subcomponents, such as CAD graphical user interface (GUI) 116, which may enable interaction between a user and software 108 and/or CAD program 112. Software 108 and/or CAD program 112 may cause GUI 116 to appear on a computer monitor, for example, and the GUI may present a user with a virtual representation of one or more CAD model, such as CAD model representation 116A. CAD model representation 116A may be derived from one or more CAD model, such as CAD model 104A, which may be stored in CAD model data storage 104, for example, and may specify desired shapes, properties, and/or other aspects of a structure that a user may request a supplier (or manufacturer) to fabricate in accordance with such information. In order to facilitate user interaction with CAD GUI 116, the CAD GUI may also include a cursor 116B that a user can utilize to manipulate one or more aspects of the GUI through, for example, a mouse or other pointing device. CAD GUI 116 may further present a user with an RFQ GUI initiation button 116C in the form of, for example, a soft selection button. A user may utilize RFQ GUI initiation button 116C by, for example, clicking it with a mouse via cursor 116B or otherwise selecting it in order to initiate RFQ e-mail functionality of system 100, which may include an RFQ e-mail GUI 120.

One or more of software 108 and CAD program 112 may present RFQ e-mail GUI 120 to a user such that they may select one or more suppliers and/or manufacturing specifications to associate with an RFQ. RFQ e-mail GUI 120 may be implemented in the form of, for example, a pop-up window, a series of text entry fields, drop-down menus, radio buttons, check boxes, and/or any other suitable interface for allowing a user to select and/or otherwise specify one or more suppliers and/or manufacturing specifications to associate with an RFQ. At least one of software 108, CAD program 112, CAD GUI 116, and RFQ e-mail GUI 120 may include an e-mail template 124, which the software and/or CAD program may utilize to generate portions of an RFQ e-mail 128 in order to communicate one or more user-provided manufacturing specifications to one or more user-specified suppliers, such as supplier 132. E-mail template 124 may include one or more strings of text that software 108 and/or CAD program 112 may augment based on one or more pieces of user-supplied information.

In one embodiment, e-mail template 124 may include one or more "blanks" or placeholders that software 108 and/or CAD program 112 may automatedly populate with one or more pieces of user-supplied information. For example, e-mail template 124 may contain a string of text such as "This order requires <Quantity> parts to be made" and software 108 and/or CAD program 112 may populate the placeholder "<Quantity>" with a value based on one or more user-provided manufacturing specifications. By manipulating RFQ e-mail GUI 120, a user may cause software 108 and/or CAD program 112 to automatedly generate RFQ e-mail 128 based at least partially on e-mail template 124. RFQ e-mail 128 may include various user-provided manufacturing specifications and one or more attached CAD model information files, which may include CAD models such as CAD model 104A. It is noted that although FIG. 1 depicts RFQ e-mail 128 as being included within software 108 in this example, it will be appreciated that, in some embodiments, the RFQ e-mail may be included in CAD program 112 or in any other location provided that it can be generated as a function of user manipulation of RFQ e-mail GUI 120.

In order to facilitate generation of RFQ e-mail 128, software 108 and/or CAD program 112 may draw information from one or more sources, such as an optional design document 136 or CAD model 104A, which the software and/or CAD program may include or generate. Design document 136 may comprise one or more CAD models, such as CAD model 104A, and may contain a record of various geometric and/or feature data associated with one or more CAD models. Design document 136 may be, for example, a CAD file or other document specifying or otherwise including information regarding one or more CAD models or designs, such as CAD model 104A. A user may optionally cause CAD program 112 to generate design document 136 by, for example, manipulating one or more aspects of CAD GUI 116. Software 108 and/or CAD program may draw additional information from a supplier database 140, which may store information associated with various suppliers associated with system 100. Such information may include, for example, a list of suppliers and corresponding e-mail addresses, supplier ratings and capabilities, and/or other supplier-related information. Like CAD model storage 104, supplier database 140 may comprise one or more databases and may include and/or be implemented in or as a server, a hard drive, a CD, a flash drive, cloud storage, or any other type of data storage. It is noted that although FIG. 1 depicts supplier database 140 as being separate from software 108 and CAD program 112 for the purposes of this example, it will be appreciated that, in some embodiments, the software and/or CAD program may contain the supplier database. In some embodiments, software 108 and/or CAD program 112 may, either automatically and/or automatedly as a function of a user request, derive information associated with one or more suppliers from various sources, such as independent websites or databases (not shown), among others, and store the information in supplier database 140 in association with the corresponding suppliers.

In this example, system 100 further provides a number of data links to enable data communication between various portions thereof. System 100 may implement these links in the form of, for example, an Internet connection, a local network connection, and/or any other connection between electronic devices or portions of one or more devices. For example, system 100 provides a model data link 144, which, in this embodiment, enables communication between CAD model data storage 104 and software 108. For example, software 108 may retrieve and/or receive CAD model information, such as CAD model 104A, from CAD model data storage 104 via model data link 144. Further, software 108 and/or CAD program 112 may enable a user to save new or updated information to CAD model data storage 104 when, for example, the user makes changes to CAD model data drawn from the CAD model data storage via CAD program 112; the software and/or CAD program may automate this process and may perform the process either continuously or on a timed schedule as a function of user preferences (not shown) set in the software and/or the CAD program. Similarly, when, for example, a user is using CAD program 112 to work with CAD model data drawn from information in CAD model data storage 104 and the information in the CAD model data storage changes due to, for example, another user's modifications, software 108 and/or CAD program 112 may allow the user to load the updated information and, based on the updated information, update the CAD model data the user is working with accordingly; the software and/or CAD program may also automate this process and may perform the process either continuously or on a timed schedule as a function of user preferences (not shown) set in the software and/or the CAD program.

System 100 may further provide a basic data link 148, which may enable communication/updates between CAD GUI 116 and optional design document 136, or directly between CAD GUI 116 and RFQ E-mail GUI 120. For example, CAD program 112 may utilize basic data link 148 in order to create or update design document 136 as a function of user manipulation of CAD GUI 116; the CAD program may automate this process and may perform the process either continuously or on a timed schedule as a function of user preferences (not shown) set in the CAD program. System 100 may also provide a supplier data link 152, which may enable communication/updates between supplier database 140 and CAD program 112. For example, CAD program 112 may retrieve/receive a list of suppliers and associated e-mail addresses from supplier database 140 such that RFQ e-mail GUI 120 may present them to a user; the CAD program and/or supplier database may automate this process and may perform the process either continuously or on a timed schedule as a function of user preferences (not shown) set in the CAD program and/or software 108.

System 100 may additionally provide a design document data link 156, which may enable communication/updates between RFQ e-mail GUI 120 and optional design document 136. For example, CAD program 112 may utilize design document data link 156 to create or update the display of RFQ e-mail GUI 120; the CAD program may automate this process and may perform the process either continuously or on a timed schedule as a function of user preferences (not shown) set in the CAD program. System 100 may also provide an e-mail creation data link 160, which may enable CAD program 112 to cause software 108 to generate RFQ e-mail. For example, CAD program 112 may transmit some or all user-provided data and selections in RFQ e-mail GUI 120 to software 108 to generate RFQ e-mail 128. In alternative embodiments, CAD program 112 may generate RFQ e-mail 128 internally without utilizing any other aspects of software 108. System 100 may further provide an output e-mail data link 164, which may enable communication between software 108 and supplier 132. For example, software 108 may utilize output e-mail data link 164 to transmit RFQ e-mail 128 one or more user-specified suppliers, such as supplier 132. In alternative embodiments, CAD program 112 may transmit RFQ e-mail 128 directly to one or more suppliers without utilizing any other aspects of software 108.

Figure 2:
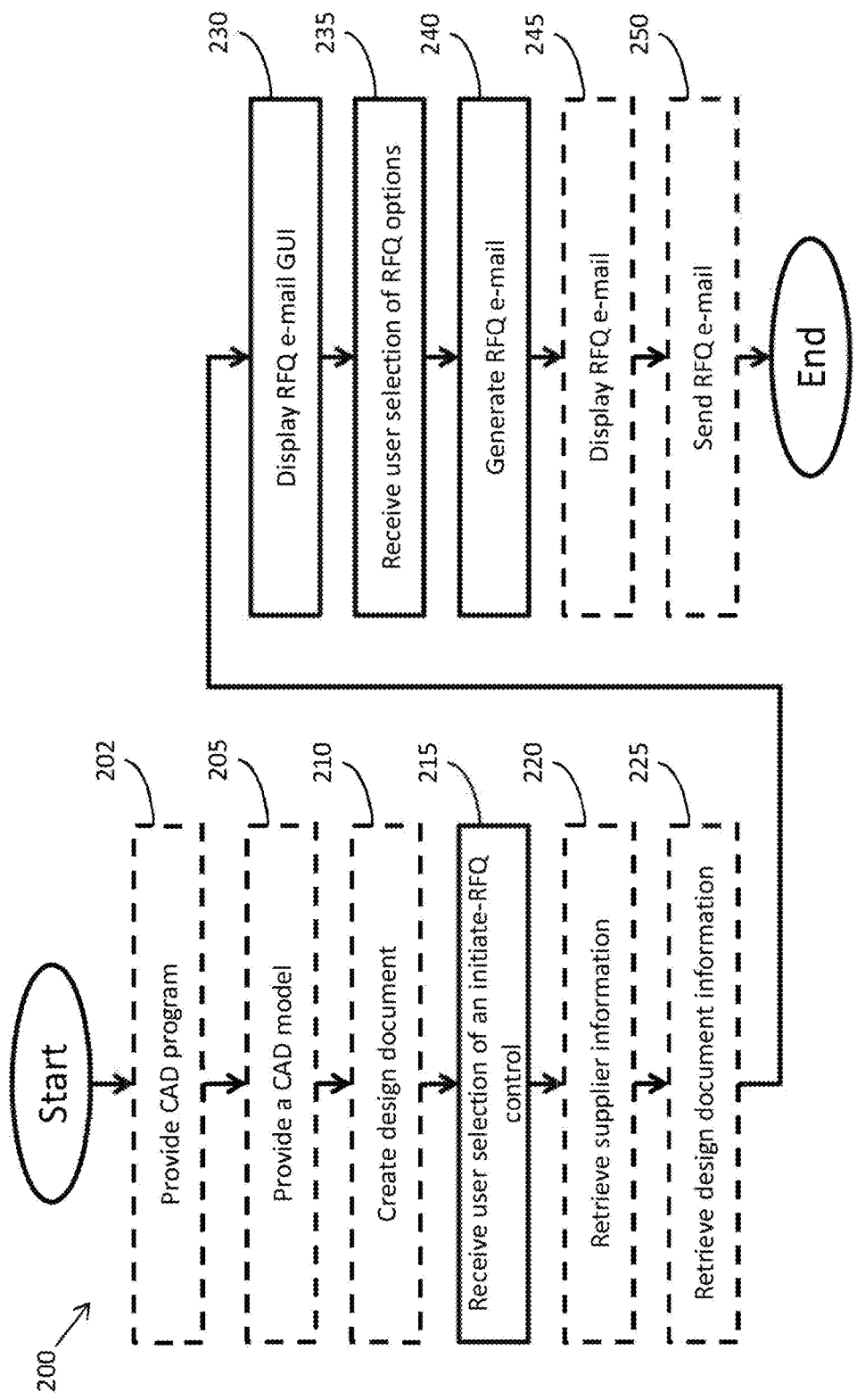
FIG. 2 is a flow diagram of a method for generating, customizing, and automatedly e-mailing an RFQ for fabricating a computer-modeled structure from within a CAD program.

With reference to FIG. 2 and continued reference to FIG. 1, a method 200 by which one or more of software 108 and CAD program 112 may generate, customize, and automatedly e-mail an RFQ for fabricating a computer-modeled structure will now be described. At optional step 202, a CAD program may be provided, such as CAD program 112, and at optional step 205, a CAD model may be provided within a CAD GUI, such as CAD GUI 116. For example, a user may design such a CAD model using CAD program 112 or import it (e.g., CAD model 104A) from CAD model data storage 104 via model data link 144. CAD model 104A may specify a sheet metal structure, for example, as illustrated in FIG. 1 as CAD model representation 116A. At optional step 210, CAD program 112 may create design document 136, which may include basic CAD model geometry data and/or feature data, among others, via basic data link 148. In some embodiments, CAD program 112 may not need to create design document 136, such as when the CAD program has previously created the design document or when CAD model 104A is sent directly without the creation of the design document.

At step 215, software 108 and/or CAD program 112 may receive user selection of an initiate-RFQ control, such as RFQ GUI initiation button 116C, via CAD GUI 116 through user input such as, for example, using a mouse to manipulate cursor 116B. At optional step 220, software 108 and/or CAD program 112 may retrieve/receive supplier information from supplier database 140 via supplier data link 152 such that RFQ e-mail GUI 120 may present the supplier information to a user. In some embodiments, CAD program 112 may not need to retrieve/receive supplier information from supplier database 140, such as when the CAD program has previously retrieved/received such information.

At optional step 225, CAD program 112 may retrieve information from design document 136 for display in RFQ e-mail GUI 120 and/or inclusion in RFQ e-mail 128 via design document data link 156. At step 230, software 108 and/or CAD program 112 may display or otherwise present RFQ e-mail GUI 120 to a user. RFQ e-mail GUI 120 may present a list of user-selectable suppliers and common manufacturing specifications to the user such that they can customize the recipients and other details of RFQ e-mail 128. As may be apparent to one skilled in the art, it is not necessary to present a GUI specifically for E-mails. Alternatively, a standard GUI or other interactive element may be used. At step 235, CAD program 112 may receive user selections made through RFQ e-mail GUI 120. At step 240, CAD program 112 and/or software 108 may generate RFQ e-mail 128 via e-mail creation data link 160 such that it may be sent to one or more e-mail addresses of one or more user-selected suppliers, such as supplier 132. In some embodiments, CAD program 112 and/or software 108 may automatedly attach one or more appropriate design documents or CAD models, such as design document 136 or CAD model 104A, to RFQ e-mail 128.

At optional step 245, CAD program 112 may display a preview of RFQ e-mail 128 to the user in RFQ e-mail GUI 120 such that the user may edit the e-mail. In one embodiment, the preview of RFQ e-mail 128 may include user-modifiable fields for e-mail addresses, attachments, and text.

At step 250, after the user indicates that RFQ e-mail 128 is ready for transmittal to one or more selected suppliers, CAD program 112 and/or software 108 may send the RFQ e-mail to the one or more suppliers, such as supplier 132, via output e-mail data link 164.

FIG. 3 illustrates a screenshot depicting exemplary aspects of RFQ e-mail GUI 120 as a user may see it during operation of system 100, such as during steps 230 and 235 of method 200. In this example, RFQ e-mail GUI 120 includes a supplier selection panel 300 that a user may manipulate to select one or more suppliers to which they desire to send RFQ e-mail 128. RFQ e-mail GUI 120 may implement supplier selection panel 300 as, for example, a software window containing a list of suppliers and a series of associated checkboxes the user can select. RFQ e-mail GUI 120 may further include a manufacturing specifications panel 304 that a user may manipulate to select and/or provide various manufacturing specifications they desire to include in RFQ e-mail 128. RFQ e-mail GUI 120 may implement manufacturing specifications panel 304 as, for example, a software window containing text entry fields and drop-down menus, among others, allowing the user to provide information such as a quantity to be fabricated, a lead-time, a need date, one or more finishing type, and one or more material to be used in fabrication. It is emphasized that the panels and fields described here and shown in FIG. 3 are merely exemplary; it will be readily apparent to one of ordinary skill in the art after reading this disclosure in its entirety that innumerable combinations and permutations of similar panels and/or fields may be used to implement RFQ e-mail GUI 120, as desired and/or required for particular applications.

RFQ e-mail GUI 120 may further include a representation 308 of an attached file, which may include a text area displaying the file name and/or file type of the attached document. The attached file may include some or all of the information contained in one or more CAD models and/or design documents, such as CAD model 104A and/or design document 136. In some embodiments, software 104 and/or CAD program 108 may automatedly load appropriate design documents and/or other files and may display information identifying them via representation 308, while in other embodiments the software and/or CAD program may wait for user selection of representation 308 (which may, in this case, be a blank box, button, or other similar user interface element prior to a user selecting it) to automatedly load appropriate files. Software 104 and/or CAD program 108 may perform such automated loading of appropriate files by, for example, analyzing one or more of a user command and/or usage history, one or more loaded and/or displayed CAD models, and recent user selections in order to identify files related to the design on which the user is currently working. In some embodiments, the user may select representation 308 of the attached file to select different and/or additional design documents or other files to attach to RFQ e-mail 128; software 108 and/or CAD program 112 may present the user with appropriate dialogs/prompts via, for example, CAD GUI 116, in order to facilitate such selections.

RFQ e-mail GUI 120 may additionally include a cursor 312 that a user can utilize to manipulate one or more aspects of GUI 120 through, for example, a mouse or other pointing device. In some embodiments, cursor 312 may be the same cursor as cursor 116B, while in other embodiments RFQ e-mail GUI 120 may implement cursor 312 independently from cursor 116B.

In order to allow a user to accept or cancel the selections/inputs provided in RFQ e-mail GUI 120, the RFQ e-mail GUI may provide a "cancel" button 316 and a "confirm" button 320 in the form of, for example, soft-selection buttons. In one embodiment, user selection of "cancel" button 316 may cause RFQ e-mail GUI 120 to exit/cease to display without saving the user's selections/inputs, while user selection of "confirm" button 320 may cause CAD program 112 and/or software 108 to exit/cease to display the RFQ e-mail GUI, to store the user's selections/inputs, and/or to generate RFQ e-mail 128 based on the user's selections/inputs and/or e-mail template 124.

Figure 4:
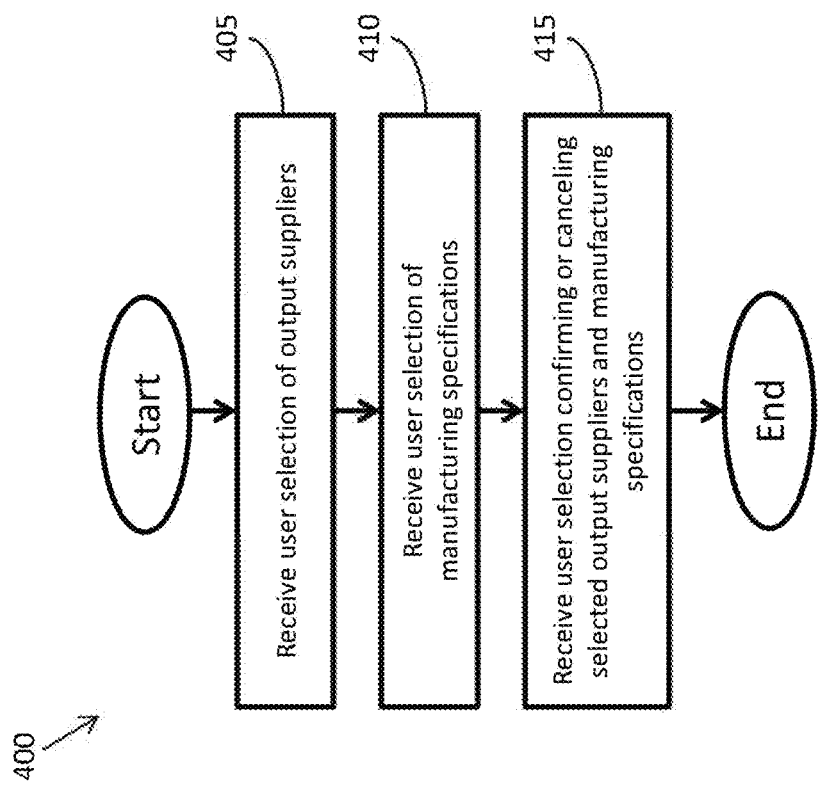
FIG. 4 is a flow diagram of a method for receiving user customizations of an RFQ e-mail.

With reference to FIG. 4 and continued reference to FIGS. 1-3, a method 400 by which one or more of software 108 and CAD program 112 may receive a user's selection of RFQ options will now be described. In some embodiments, step 235 of method 200 may include method 400. At step 405, software 108 and/or CAD program 112 may receive user selection of one or more output suppliers, such as one or more of the suppliers displayed in supplier selection panel 300, via, for example, user selection of checkboxes within the supplier selection panel via cursor 312. At step 410, software 108 and/or CAD program 112 may receive user selection/input of manufacturing specifications, such as one or more of the manufacturing specifications listed in manufacturing specifications panel 304, via, for example, user selection/input within the manufacturing specifications panel via cursor 312 and/or one or more other data entry devices, such as a keyboard (not shown). At step 415, software 108 and/or CAD program 112 may receive user selection/input of "confirm" button 320 or "cancel" button 316 via, for example, user selection within the manufacturing specifications panel via cursor 312.

Figure 5:
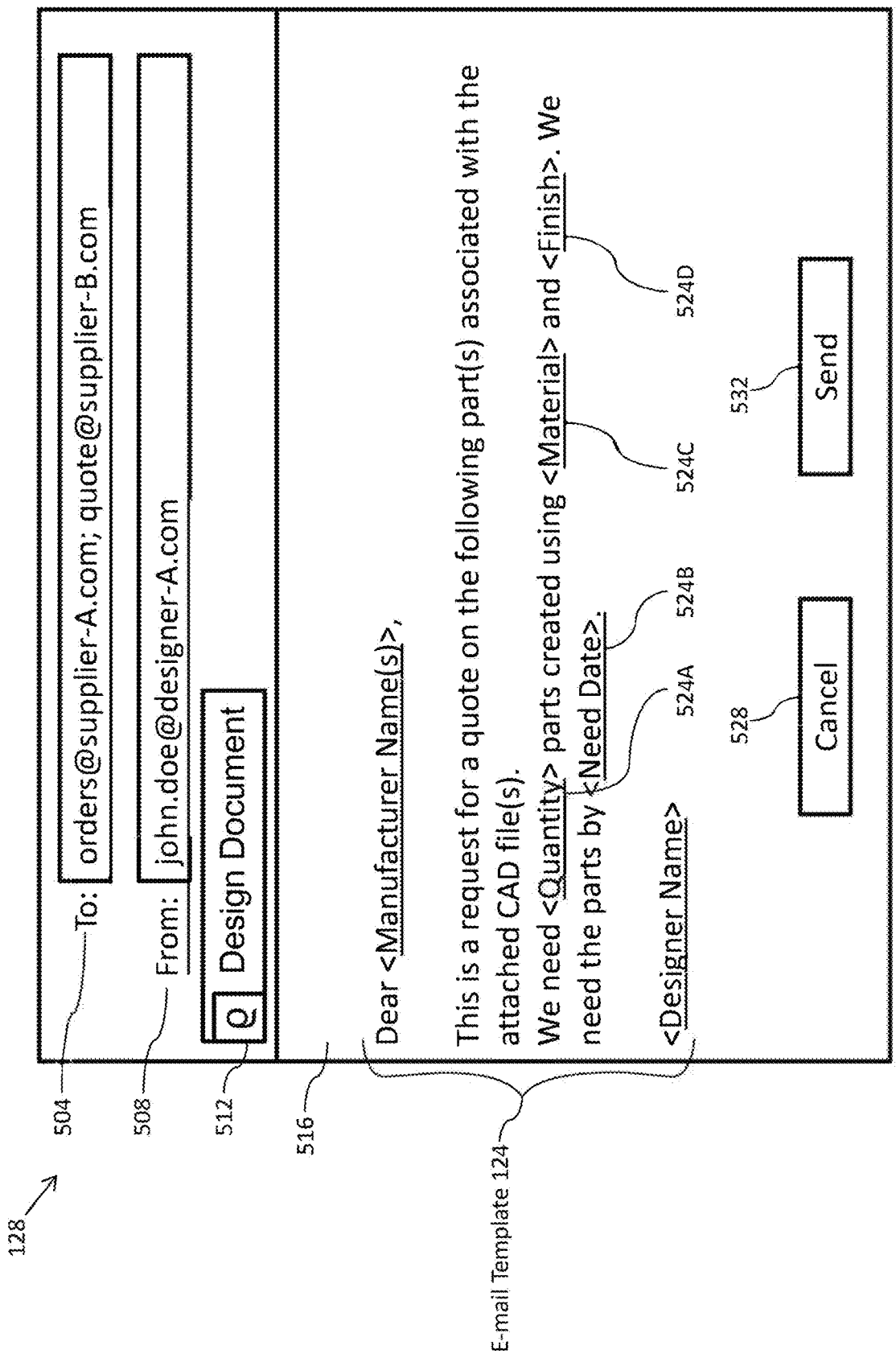
FIG. 5 is a representational screenshot of an RFQ e-mail generated in accordance with aspects of the invention.

FIG. 5 illustrates a screenshot depicting exemplary aspects of RFQ e-mail 128 as a user may see it in an e-mail viewer during operation of system 100, such as, for example, at step 245 of method 200. In this example, RFQ e-mail 128 includes a "to" field 504, which may provide a user-editable text entry field that software 104 and/or CAD program 108 may automatedly populate with one or more e-mail addresses of one or more user-selected suppliers, such as suppliers selected within supplier selection panel 300. In an alternative embodiment, the "to" field may include the e-mail of the user, while the e-mail addresses of one or more user-selected suppliers may be found in another field such as a blind carbon copy ("BCC") field that will cause the e-mail to be sent to each supplier but will not allow the suppliers to view the other suppliers that have been contacted. RFQ e-mail 128 may further include a "from" field 508, which may provide a user-editable text entry field that software 104 and/or CAD program 108 may automatedly populate with the user's e-mail address or any other e-mail address(es) the user specified in software and/or CAD program settings (not shown). RFQ e-mail 128 may also include a representation 512 of an attachment, which may include a text area displaying the file name and/or file type of the attached document. In some embodiments, as with representation 308 of FIG. 3, software 104 and/or CAD program 108 may automatedly load appropriate design documents and/or other documents such as CAD model 104A and may display information identifying them via representation 512, while in other embodiments the software and/or CAD program may wait for user selection of representation 512 (which may, in this case, be a blank box, button, or other similar user interface element prior to a user selecting it) to automatedly load appropriate design documents or CAD models. Software 104 and/or CAD program 108 may perform such automated loading of appropriate documents by, for example, analyzing one or more of a user command and/or usage history, one or more loaded and/or displayed CAD models, and recent user selections in order to identify documents related to the design on which the user is currently working. In some embodiments, the user may select representation 512 of the attached document to select different and/or additional design documents or other documents such as CAD models to attach to RFQ e-mail 128; software 108 and/or CAD program 112 may present the user with appropriate dialogs/prompts via, for example, CAD GUI 116, in order to facilitate such selections. RFQ e-mail 128 may further include a content window 516, which may be a user-editable text entry window allowing a user to type and edit text in order to compose a message to be sent to suppliers.

In some embodiments, software 104 and/or CAD program 112 may automatedly populate content window 516 based on e-mail template 124. As discussed above, e-mail template 124 may include one or more strings of text that software 108 and/or CAD program 112 may augment based on one or more pieces of user-supplied information. In this example, e-mail template 124 also includes multiple "blanks" or placeholders (indicated as underlined terms, each surrounded by a less-than sign and a greater-than sign), such as manufacturing specification placeholders 524A-D, that software 108 and/or CAD program 112 may automatedly populate with user-supplied information, such as information the user provided to RFQ e-mail GUI 120. In this example, based on user input in RFQ e-mail GUI 120 as shown in FIG. 3, software 108 and/or CAD program 112 may, for example, populate the "<Manufacturer Name(s)>" field with "Supplier A and Supplier B" and the "<Quantity>" field with 100. In alternative embodiments, software 108 and/or CAD program 112 may generate a separate e-mail for each user-selected supplier. RFQ e-mail 128 may further include a "cancel" button 528 and a "send" button 532 in the form of, for example, soft-selection buttons. In one embodiment, user selection of "cancel" button 528 may cause RFQ e-mail 128 to exit/cease to display without saving the user's selections/inputs, while user selection of "send" button 532 may cause CAD program 112 and/or software 108 to exit/cease to display the RFQ e-mail, to store the user's selections/inputs, and/or to send RFQ e-mail 128 to one or more user-selected/provided suppliers, such as supplier 132. It is emphasized that the description and depictions of e-mail template 124 and RFQ e-mail 128 provided here and in FIG. 5 are merely exemplary; it will be readily apparent to one of ordinary skill in the art after reading this disclosure in its entirety that many appropriate modifications may be made to the e-mail template 124 and/or RFQ e-mail, as desired and/or required for particular applications. For example, more placeholders may be utilized, text may be modified and/or rearranged, and/or a user may be required to manually enter a portion of the RFQ e-mail, such as, for example, the "<Manufacturer Name(s)>" field and/or the "<Designer Name>" field, among others.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

Figure 6:
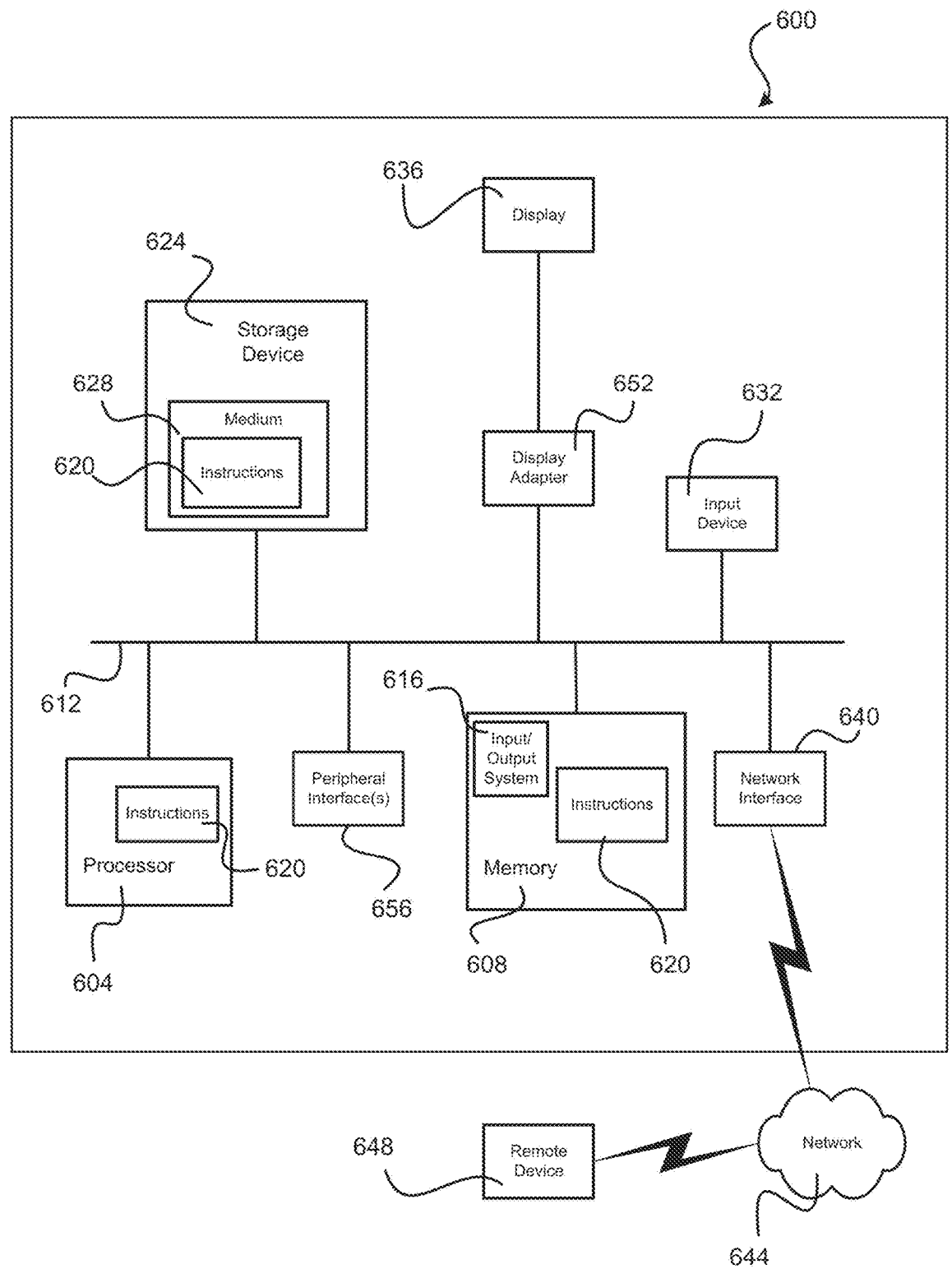
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system, such as the RFQ e-mail system 100 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. A system for automatedly generating a request for quotation (RFQ) electronic mail (email) template, the system comprising:
a computing device; and
a software operating on the computing device, the software comprising a CAD program configured to modify one or more CAD models, wherein the software is configured to:
receive, using the CAD program, a CAD model through a model data link;
extract geometric data from the CAD model;
identify a subset of user-selectable suppliers from a list of user-selectable suppliers based on the CAD model, wherein each user-selectable supplier of the subset of user-selectable suppliers comprises an associated email address;
retrieve supplier data related to the subset of user-selectable suppliers through a supplier data link;
automatedly load a design document based on a user usage history and the geometric data from the CAD model, wherein the user usage history includes recent user selections;
provide, as a function of a timed schedule, a data link between an RFQ electronic mail template and the design document;
populate the RFQ electronic mail template as a function of the design document;
generate an RFQ electronic mail based on the RFQ electronic mail template through an electronic mail creation data link; and
send the RFQ electronic mail to the associated email address of at least one user-selectable supplier of the subset of user-selectable suppliers through an output electronic mail data link.

2. The system of claim 1, wherein the design document comprises design data associated with one or more CAD models.

3. The system of claim 1, wherein receiving user-supplied data comprises automatically loading the design document based on a user usage history comprising recent user selections.

4. The system of claim 1, wherein identifying the subset of user-selectable suppliers comprises updating the design document as a function of a user input through a basic data link.

5. The system of claim 1, wherein identifying the subset of user-selectable suppliers comprises:
identifying the subset of user-selectable suppliers as a function of a timed schedule.

6. The system of claim 1, wherein the RFQ electronic mail template comprises a plurality of supplier specification placeholders.

7. The system of claim 6, wherein generating the RFQ electronic mail comprises selecting a subset of supplier specification placeholders from the plurality of supplier specification placeholders based on a user input.

8. The system of claim 7, wherein generating the RFQ electronic mail comprises automatically populating the subset of supplier specification placeholders with the retrieved supplier data.

9. The system of claim 1, wherein generating the RFQ electronic mail comprises generating a RFQ electronic mail preview comprising one or more user-modifiable fields.

10. The system of claim 1, wherein generating the RFQ electronic mail comprises displaying the RFQ electronic mail to a user using an RFQ electronic mail GUI.

11. A method for automatedly generating a request for quotation (RFQ) electronic mail (email) template, the method comprising:
receiving, by a software operating on a computing device, a CAD model from a CAD program and through a model data link;
extracting, using the computing device, geometric data from the CAD model;
identifying, using the computing device, a subset of user-selectable suppliers from a list of user-selectable suppliers based on the CAD model, wherein each user-selectable supplier of the subset of user-selectable suppliers comprises an associated email address;
retrieving, using the computing device, supplier data related to the subset of user-selectable suppliers through a supplier data link;
automatedly loading, using the computing device, a design document based on a user usage history and the geometric data from the CAD model, wherein the user usage history includes recent user selections;

providing, using the computing device and as a function of a timed schedule, a data link between an RFQ electronic mail template and the design document;

populate, using the computing device, the RFQ electronic mail template as a function of the design document;

generating, using the computing device, an RFQ electronic mail based on the RFQ electronic mail template through an electronic mail creation data link; and sending, using the computing device, the RFQ electronic mail to the associated email address of at least one user-selectable supplier of the subset of user-selectable suppliers through an output electronic mail data link.

12. The method of claim 11, wherein the design document comprises design data associated with one or more CAD models.

13. The method of claim 11, wherein receiving user-supplied data comprises automatically loading the design document based on a user usage history comprising recent user selections.

14. The method of claim 11, wherein identifying the subset of user-selectable suppliers comprises updating the design document as a function of a user input through a basic data link.

15. The method of claim 11, wherein identifying the subset of user-selectable suppliers comprises:

identifying the subset of user-selectable suppliers as a function of a timed schedule.

16. The method of claim 11, wherein the RFQ electronic mail template comprises a plurality of supplier specification placeholders.

17. The method of claim 16, wherein generating the RFQ electronic mail comprises selecting a subset of supplier specification placeholders from the plurality of supplier specification placeholders based on a user input.

18. The method of claim 17, wherein generating the RFQ electronic mail comprises automatically populating the subset of supplier specification placeholders with the retrieved supplier data.

19. The method of claim 11, wherein generating the RFQ electronic mail comprises generating a RFQ electronic mail preview comprising one or more user-modifiable fields.

20. The method of claim 11, wherein generating the RFQ electronic mail comprises displaying the RFQ electronic mail to a user using a RFQ electronic mail GUI.

* * * * *